United States Patent [19]
Croudace
[11] 4,444,565
[45] Apr. 24, 1984

[54] METHOD AND FUEL COMPOSITION FOR CONTROL OF OCTANE REQUIREMENT INCREASE

[75] Inventor: Michael C. Croudace, Huntington Beach, Calif.
[73] Assignee: Union Oil Company of California, Los Angeles, Calif.

[21] Appl. No.: 451,279
[22] Filed: Dec. 20, 1982
[51] Int. Cl.$^3$ ................................ C01L 1/18
[52] U.S. Cl. ................................ 44/68; 44/69; 44/70
[58] Field of Search .............. 44/69, 68, 70; 123/1 A, 123/198 A

[56] References Cited

U.S. PATENT DOCUMENTS

| | | | |
|---|---|---|---|
| 1,995,615 | 3/1935 | Jaeger | 44/70 |
| 2,210,942 | 8/1940 | Lipkin | 44/70 |
| 2,228,662 | 1/1941 | Holm | 44/69 |
| 2,334,006 | 11/1943 | Holm | 44/70 |
| 2,810,736 | 10/1957 | Catlin et al. | 44/68 |
| 2,867,516 | 1/1959 | Pedersen | 44/68 |
| 2,918,360 | 12/1959 | Lauer | 44/69 |
| 2,985,522 | 5/1961 | Binning et al. | 44/70 |
| 2,988,564 | 6/1961 | Graham | 44/68 |
| 3,009,792 | 11/1961 | Eckert et al. | 44/70 |
| 3,009,793 | 11/1961 | Eckert et al. | 44/70 |
| 3,010,981 | 11/1961 | Rausch | 44/68 |
| 3,046,318 | 7/1962 | Ayers et al. | 44/70 |
| 3,064,026 | 11/1962 | Rausch | 44/68 |
| 3,083,086 | 3/1963 | Case et al. | 44/70 |
| 3,083,088 | 3/1963 | Carlson et al. | 44/70 |
| 3,085,002 | 4/1963 | Lauer | 44/69 |
| 3,144,311 | 8/1964 | Armstrong et al. . | |
| 3,146,203 | 8/1964 | Frew, Jr. . | |
| 3,190,902 | 6/1965 | Coffield et al. | 44/68 |
| 3,341,311 | 9/1967 | Pedersen | 44/69 |
| 3,353,938 | 11/1967 | Niedzielski | 44/68 |
| 3,419,367 | 12/1968 | Eckert et al. | 44/70 |
| 3,421,867 | 1/1969 | Heisler et al. | 44/70 |
| 3,506,416 | 4/1970 | Patinkin et al. . | |
| 3,522,179 | 7/1970 | Le Suer et al. | 44/70 |
| 4,139,349 | 2/1979 | Payne . | |
| 4,161,160 | 7/1979 | Hicks et al. | 123/1 A |
| 4,210,103 | 7/1980 | Dimitroff | 123/1 A |
| 4,264,335 | 4/1981 | Bello et al. . | |
| 4,336,033 | 6/1982 | Hinkamp . | |
| 4,357,148 | 11/1982 | Graiff . | |

OTHER PUBLICATIONS

Richardson et al., The Journal of Chemical Engineering Data, vol. 6, No. 2, (Apr. 1961), pp. 309 to 312.
Unzelman et al., AiCHe, vol. 22, No. 4.

*Primary Examiner*—Charles F. Warren
*Assistant Examiner*—Mrs. Y. Harris-Smith
*Attorney, Agent, or Firm*—Dean Sandford; Gregory F. Wirzbicki; Robert J. Baran

[57] ABSTRACT

The control of the octane requirement increase phenomenon in a spark ignition internal combustion engine is achieved by introducing with the combustion charge a fuel composition containing an octane requirement increase-inhibiting amount of (a) an oil-soluble iron compound and (b) carboxylic acids and/or certain derivatives thereof. In particular the esters of a tertiary alcohol and an unsubstituted, mono-carboxylic acid having at least two carbon atoms, e.g., t-butylacetate, in combination with dicyclopentadienyl iron provides an effective octane requirement increase-inhibiting additive for unleaded gasoline.

39 Claims, No Drawings

METHOD AND FUEL COMPOSITION FOR CONTROL OF OCTANE REQUIREMENT INCREASE

BACKGROUND OF THE INVENTION

1. Field of the Invention

This invention relates to improved hydrocarbon fuels which control the octane requirement increase (ORI) phenomenon conventionally observed during the initial portion of the operating life of spark ignition internal combustion engines.

2. Description of the Art

The octane requirement increase (ORI) effect exhibited by internal combustion engines, e.g., spark ignition engines, is well known in the art. This effect may be described as the tendency for an initially new or clean engine to require higher octane quality fuel as operating time accumulates and is coincidental with the formation of deposits in the region of the combustion chamber of the engine. Thus, during the initial operation of a new or clean engine, a gradual increase in octane requirement (OR), i.e., fuel octane number required for knock-free operation, is observed with an increasing buildup of combustion chamber deposits until a rather stable or equilibrium OR level is reached, which, in turn, seems to correspond to a point in time where the quantity of deposit accumulation on the combustion chamber and valve surfaces no longer increases but remains relatively constant. This so-called "equilibrium value" is usually reached between about 3,000 and 20,000 miles or corresponding hours of operation. The actual equilibrium value of this increase can vary with engine design and even with individual engines of the same design; however, in almost all cases the increase appears to be significant, with ORI values ranging from about 2 to 14 Research Octane Numbers (RON) being commonly observed in modern engines.

It is also known that additives may prevent or reduce deposit formation, or remove or modify formed deposits, in the combustion chamber and adjacent surfaces and hence decrease OR. Such additives are generally known as octane requirement reduction (ORR) additives.

For example, in U.S. Pat. No. 4,264,335 to Bello et al., the cerous or ceric salt of 2-ethylhexanoate is disclosed as a useful additive for suppressing the octane requirement increase of a gasoline fired internal combustion engine. It is noted in this patent that the above salt has no effect on combustion efficiency of a gasoline and does not provide anti-knock properties.

In U.S. Pat. No. 4,357,148 to Graiff there is disclosed an additive for controlling or reversing the octane requirement increase of a spark ignition internal combustion engine which comprises a combination of (a) certain oil soluble aliphatic polyamines and (b) certain low molecular weight polymers and/or copolymers of mono-olefins having up to 6 carbon atoms.

U.S. Pat. No. 3,506,416 to Patinkin et al. discloses an additive to inhibit octane requirement increase of a spark ignition engine which comprises a gasoline soluble metal salt of a hydroxamic acid. This additive is disclosed as useful in leaded gasoline. Although iron is within the broad group of metal salts of hydroxamic acid that are disclosed as a suitable additive for suppression of octane requirement increase, no data demonstrating its effectiveness are given. In fact, the patentees point out that nickel and cobalt are especially preferred for their additive.

Other references describing additives for inhibiting octane requirement increase include U.S. Pat. Nos. 3,144,311 and 3,146,203 which disclose utilization of nitrogen ring compounds in combination with organo metallic primary antiknock agent and a minor amount of an ignition control additive selected from the group consisting of phosphorus and boron compounds.

Thus, none of the references disclose the combination of an oil-soluble iron compound and a carboxylic acid or ester thereof for use in suppressing the octane requirement increase of a spark ignition internal combustion engine.

Various workers in an attempt to improve the anti-knock properties of gasolines have tested iron compounds and carboxylic acids and esters as gasoline additives. For example, U.S. Pat. No. 3,344,311 discloses that various dicyclopentadienyl iron compounds are useful as anti-knock additives for gasolines. This reference teaches that the dicyclopentadienyl iron compound in combination with tetraethyl lead provides a synergistic anti-knock additive for gasoline. Other workers have tested dicyclopentadienyl iron in combination with manganese (U.S. Pat. No. 4,139,349) and nickel (U.S. Pat. No. 3,353,938) and found that such combinations provide synergistic anti-knocking properties as compared to either individual component alone. None of these references, however, suggests the combination of dicyclopentadienyl iron with carboxylic acids or esters thereof.

Various carboxylic acids and derivatives thereof have been tested for extending the anti-knocking properties of lower alkyl lead compounds such as tetraethyl lead. See for example, 'Carboxylic Acids Extend the Antiknock Effectiveness of Tetraethyl Lead,' W. L. Richardson et al., *The Journal of Chemical & Engineering Data,* Volume 6, No. 2, (April 1961), pages 309–312. This article suggests that tertiary butyl acetate and other efficient extenders operate by decomposing to a carboxylic acid, which combines with lead oxide during the combustion cycle to alleviate knocking properties of gasolines to which such extenders are added. It is pointed out that the optimum mole ratio of the extender to tetraethyl lead is 15, a much higher ratio than required for the iron-carboxylic acid or ester derivative disclosed in this invention. Moreover, this reference is limited to extending the anti-knock properties of alkyl lead additives and does not suggest the combination of such extenders with any other organo metallic compound.

Another reference which discusses extending the anti-knock properties of tetraalkyl lead is 'Are There Substitutes For Lead Antiknocks?' G. H. Unzelman et al., *AIChE* Volume 22, No. 4, beginning at page 701. This reference discusses the research over a period of years to find materials that could substitute or extend the properties of alkyl lead as an anti-knocking additive for gasoline. The many compounds tested include organo iron compounds such as iron carbonyl complexes which were found to be effective anti-knocking additives. The reference also discusses using organic oxygen compounds in substantial concentrations to reduce knock. The authors point out that certain esters are lead appreciators (extenders) but note that tertiary butyl acetate is of limited interest because its effectiveness diminishes as the lead content of the gasoline is reduced. Moreover, it is pointed out that tertiary butyl acetate is not as effective if the octane level of gasoline to which it is added is reduced. This reference does not suggest the combination of an iron soluble compound with a carboxylic acid or ester derivative thereof in either leaded or unleaded gasoline.

Thus, it is one object of this invention to provide a hydrocarbon fuel containing a novel additive which suppresses the octane requirement increase of spark ignited internal combustion engines.

It is another object of the instant invention to control or reverse the octane requirement increase phenomenon in a spark ignition internal combustion engine by introducing a novel additive with the fuel.

It is another object of the instant invention to provide a liquid hydrocarbon motor fuel for spark ignited internal combustion engines containing a novel anti-knock additive.

It is another object of the instant invention to provide a lead free liquid hydrocarbon fuel containing a novel anti-knock additive and a novel additive for inhibiting the octane requirement increase of a clean internal combustion engine.

Other objects are to provide new compositions of matter and to advance the art.

Other objects and advantages of the instant invention will become apparent to those skilled in the art from the following description.

SUMMARY OF THE INVENTION

It has now been found that, when minor amounts of a combination of (a) an oil soluble iron compound and (b) carboxylic acids and/or ester derivatives thereof, are used as a gasoline additive, a significant reduction in ORI is produced.

Accordingly, the invention provides a method for operating a spark ignition internal combustion engine which comprises introducing with the combustion intake charge to said engine an octane requirement increase-inhibiting amount of (a) an oil-soluble iron compound, and (b) a carboxylic acid and/or an ester derivative thereof, preferably wherein said carboxylic acid is a carboxylic acid having at least two carbons and more preferably an unsubstituted monocarboxylic acid.

The invention further provides a motor fuel composition comprising a mixture of hydrocarbons boiling in the gasoline range of about 50° C. (122° F.) to about 232° C. (450° F.) containing an octane requirement increase-inhibiting amount of (a) an oil-soluble iron compound, and (b) a carboxylic acid or derivative thereof, preferably wherein the carboxylic acid is carboxylic acid having at least two carbon atoms, and more preferably an unsubstituted monocarboxylic acid, per gallon of said mixture of hydrocarbons.

Further provided according to the invention is an octane requirement increase-inhibiting additive concentrate comprising (a) from about 1 to about 50 grams per gallon of the above described iron compound, (b) from about 10 to about 100 grams per gallon of a carboxylic acid and/or an ester derivative thereof, preferably wherein the carboxylic acid is a carboxylic acid having at least two carbon atoms (more preferably an unsubstituted monocarboxylic acid), and (c) the balance of a fuel-compatible, diluent boiling in the range from about 50° C. (122° F.) to about 232° C. (450° F.).

DETAILED DESCRIPTION OF THE INVENTION

The oil-soluble iron compound of the invention is well-known in the art. For example, see the oil-soluble iron compounds disclosed in the above cited U.S. Pat. Nos. 3,341,311; 3,353,938 and 4,139,349, which are herein incorporated by reference for the disclosure of suitable oil-soluble iron compounds. In addition to those iron compounds disclosed in the above patents, the carbonyl derivatives disclosed in the above G. H. Unzelman et al. article at page 701 may also be utilized. Additional suitable oil-soluble iron compounds include the iron salts of organic acids such as iron napthanate, iron stearate, and iron oleate, etc. and iron complexes such as iron acetyl acetonate, etc.

Preferably, the oil-soluble iron compound is selected from the group consisting of dicyclopentadienyl iron and the substituted derivatives thereof. These materials are generally more available and are more stable and safe than the various iron carbonyl complexes disclosed in the above references. In particular, it is preferred that the oil-soluble iron carbonyl compound is dicyclopentadienyl iron or a substituted dicyclopentadienyl iron wherein one or both of the cyclopentadienyl rings may be substituted with one to two lower alkyl groups. For example, alkyl substituted dicyclopentadienyl iron wherein said alkyl substituents are $C_1$ to $C_3$ alkyl groups are especially preferred.

The most preferred oil-soluble iron compound is dicyclopentadienyl iron because of its stability and availability.

Any carboxylic acid or ester derivative thereof that may be volatilized with and solubilized in gasoline may be used in this invention. Carboxylic acids having a single carboxylic group, i.e., monocarboxylic acids and at least two carbon atoms but no more than about 10 carbon atoms are preferred. The carboxylic acids having over 10 carbon atoms and the poly carboxylic acids are of marginal volatility and tend to form deposits in the engine. Moreover most dicarboxylic acids increase knocking while the single carbon carboxylic acid (formic acid) tends to be thermally unstable. Therefore these carboxylic acids are not preferred for use in this invention. A $C_2$ to $C_4$ monocarboxylic acid is more preferred for use in this invention, while the most preferred carboxylic acid is acetic acid.

The carboxylic acid will preferably be free from hetero atoms such as sulfur, halogen, etc., i.e., it will include only carbon, hydrogen and oxygen atoms therein.

Preferably the carboxylic acid is derivatized with an alcohol, and more preferably a tertiary alcohol to provide a tertiary ester. The alcohol may be a $C_1$ to $C_{10}$ alcohol, preferably a saturated alcohol, and most preferably is a $C_4$ to $C_8$ tertiary alkyl alcohol. An especially preferred tertiary alcohol ester is tertiary butyl acetate, which when combined with dicyclopentadienyl iron provides a surprising increase in inhibition of the octane requirement increase of an engine.

The iron content of the fuel of this invention is usually between 0.0001 and 10 grams per gallon of the fuel. Preferably, the iron content of the fuels of the instant invention will range from about 0.001 to about 5 grams per gallon of fuel. At a level lower than about 0.0001 grams per gallon of fuel, the desired inhibition of the octane requirement increase usually is not observed, while iron concentrations of greater than about 10 grams per gallon of fuel are expected to lead to excessive engine wear. The preferred upper level for iron concentration is selected to balance cost of the oil-soluble iron compound with a decreasing benefit by way of inhibition of octane requirement increase.

The amount of carboxylic acid and/or derivative thereof which is provided in the fuels of the instant invention will usually be at least about 0.001 grams per gallon of fuel and preferably from about 0.001 to about 10 grams per gallon of fuel. The carboxylic acid and/or derivative thereof may be adjusted based on the amount of iron provided in the fuel. For example, from about 1 to about 5 moles of carboxylic acid or derivative thereof may be provided per gram atom of iron. It is noted that the preferred tertiary alcohol esters have anti-knock properties of their own and therefore greater concentrations are not undesirable provided there is no economic debit. However, to obtain the desired inhibition of octane requirement increase no more than about 10 grams of a tertiary alcohol ester per gallon of fuel is necessary.

Suitable liquid hydrocarbon fuels of the gasoline boiling range are mixtures of hydrocarbons having a boiling range of from about 25° C. (77° F.) to about 232° C. (450° F.), and often comprise mixtures of saturated hydrocarbons, olefinic hydrocarbons and aromatic hydrocarbons. Preferred are gasoline blends having a saturated hydrocarbon content ranging from about 40 to about 80 percent volume, an olefinic hydrocarbon content from about 0 to about 30 percent volume and an aromatic hydrocarbon content ranging from about 10 to about 60 percent volume. The base fuel can be derived from straight run gasoline, polymer gasoline, natural gasoline, dimer and trimerized olefins, synthetically-produced hydrocarbon mixtures, from thermally or catalytically reformed hydrocarbons, or from catalytically cracked or thermally cracked petroleum stocks, and mixtures of these. The hydrocarbon composition and octane level of the base fuel are not critical. Any conventional motor fuel may be employed in the practice of this invention.

Normally, the hydrocarbon fuel mixtures to which the invention is applied are substantially lead-free but may contain minor amounts of blending agents such as methanol, ethanol, methyl tertiary butyl ether, and the like. The fuels may also contain antioxidants such as phenolics, e.g., 2,6-di-tert-butylphenol or phenylenediamines, metal deactivators, dehazers such as polyester-type ethoxylated alkylphenol-formaldehyde resins and the like. The fuels may also contain antiknock compounds such as tetraethyl lead, a methyl cyclopentadienylmanganese tricarbonyl, ortho-azidophenol and the like.

The octane requirement reduction additive of the present invention can be introduced into the combustion zone of the engine in a variety of ways to prevent buildup of deposits, or to accomplish reduction or modification of deposits. Thus the ORR additive can be injected into the intake manifold intermittantly or substantially continuously, as described, preferably in a hydrocarbon carrier having a final boiling point (by ASTM D86) lower than about 232° C. (450° F.). A preferred method is to add the additive to the fuel. For example, the additive can be added separately to the fuel or blended with other fuel additives.

The invention further provides a concentrate for use in liquid hydrocarbon fuel in the gasoline boiling range comprising (a) from about 1 to about 50 grams per gallon iron provided by the hereinabove described oil soluble, iron compound, (b) from at least about 10 to about 100 grams per gallon of a carboxylic acid and/or an ester derivative thereof, optionally from about 0.01 to 0.2 percent by weight of a dehazer and (d) the balance of a diluent, boiling in the range from about 50° C. (122° F.) to about 232° C. (450° F.). Diluents may include hydrocarbons and oxygen-containing hydrocarbons. Suitable oxygen-containing hydrocarbon diluents include, e.g., methanol, ethanol, propanol, methyl tert-butyl ether and ethylene glycol monobutyl ether. The hydrocarbon diluent may be an alkane such as heptane but preferably is an aromatic hydrocarbon, such as toluene or xylene, alone or in admixture with said oxygen-containing hydrocarbon diluents. Optionally, the concentrate may contain from about 0.01 to bout 0.2% by weight of a dehazer, particularly a polyester-type ethoxylated alkylphenol-formaldehyde resin.

The following example demonstrates the surprising suppression of octane requirement increase when utilizing an additive comprising an oil-soluble iron compound in combination with a tertiary ester of a mono carboxylic acid in a fuel for a spark ignited internal combustion engine. This example is meant to be illustrative of the instant invention and not intended to limit the scope of the appended claims.

EXAMPLE

An initially clean 1973 350 CID V8 Chevrolet engine is utilized to test the additive of the instant invention for the inhibition of octane requirement increase. The additive of the instant invention in the amounts given in Table 3 is added to the gasoline described in Table 1.

TABLE 1

| GASOLINE FUEL CHARACTERISTICS Characteristic | |
|---|---|
| Gravity @ 60° F. (°API) | 56.6 |
| Research Octane No. | 93.8 |
| Motor Octane No. | 83.8 |
| Reid Vaoor Pressure (psi) | 8.8 |
| FIA (D 1319) wt % | |
| Aromatics | 34.0 |
| Olefins | 8.0 |
| Saturates | 58.0 |
| Distillation (D 86) °F. | |
| Initial | 88 |
| 10% | 114 |
| 30% | 186 |
| 50% | 234 |
| 70% | 287 |
| 90% | 360 |
| 95% | 394 |
| End Point | 432 |
| Sulfur (ppm) | 255 |
| % Carbon | 86.7% |

The fuel was leaded to 0.05 gms/gallon. There was no carburetor cleanliness additive in the fuel.

The test consists of two parts, a deposit accumulation phase and a rating phase. During the deposit accumulation phase of the test, the engine is run on the cycle described in Table 2.

TABLE 2

| | | | | Temperatures | |
|---|---|---|---|---|---|
| Step | Duration (Minutes) | Speed (RPM) | Load (BHP) | Jacket Out (°F.) | Oil Sump (°F.) |
| 1 | 2 | 700 | 3 | 185 | 200–250 |
| 2 | 3 | 1700 | 15 | 185 | " |
| 3 | 4 | 1200 | 7 | 185 | " |
| 4 | 7 sec | 2225 | 100 | 185 | " |
| 5 | 3 | 2400 | 60 | 185 | " |

TABLE 3

| DICYCLOPENTADIENYL IRON and t-BUTYL ACETATE ENGINE RUNS | | | | | | | | |
|---|---|---|---|---|---|---|---|---|
| Sample | Amount Dicyclopentadienyl iron (g/gal) | Amount t-Butyl Acetate (g/gal) | Equilibrated ORI PRF | Equilibrated ORI FBRU | Equilibrated ORI FBRSU | Difference Between Additive Run and Base Fuel PRF | Difference Between Additive Run and Base Fuel FBRU | Difference Between Additive Run and Base Fuel FBRSU |
| A | 0 | 0 | 87 | 89 | 91 | — | — | — |
| B | 0.0166 | 0 | 86 | 88 | 89 | 1 | 1 | 2 |
| C | 0.0166 | 0.05 | 84 | 86 | 87 | 3 | 3 | 4 |
| D | 0.0332 | 0.1 | 82 | 83.5 | 85 | 5 | 5.5 | 6 |
| E | 0.0166 | 0.1 | 82.5 | 83.5 | 85 | 4.5 | 5.5 | 6 |

This Cycle gives an average speed of about 40 miles per hour.

During the rating phase of the test, the engine is run under tape control. The tape contains a recording of the intake manifold vacuum and engine speed of a car being accelerated according to the Coordinating Research Council (CRC) modified Uniontown Rating Procedure. 1977 CRC reference fuels are used during the rating phase to determine the octane requirement of the engine.

Prior to a test, the heads are removed from the engine and all deposits are scraped from the combustion chambers and piston crowns. The engine is then reassembled and the octane requirement of the clean engine is determined. Octane requirements are then determined at 200 hours and every 100 hours thereafter until the requirement of the engine stops increasing. A typical ORI test lasts from 400 to 600 hours. Operation for about 500 hours is equivalent to about 20,000 miles.

The reference fuels utilized in this test include a primary reference fuel (PRF), a full boiling range unleaded fuel (FDRU) and a full boiling range sensitive unleaded fuel (FDRSU). As will be appreciated from Table 3, the data related to fuel Samples C, D, and E, wherein the octane requirement increase-inhibiting additive of the instant invention is utilized, show that a lower octane fuel is required to run the engine without knocking after equilibration. In particular, a fuel comprising at least 0.1 grams per gallon of tertiary butyl acetate in the combination additive provides a difference in octane requirement increase of from 4.5 to 6 Research Octane Numbers as compared to a fuel without the additive. Moreover, as compared to Sample B wherein dicyclopentadienyl iron is utilized alone, the increase in inhibition of octane requirement increase is still at least 4 Research Octane Numbers for each fuel tested.

It is also noted that the relationship of the higher concentration of tertiary-butyl acetate to the development of ORI is distinctly different from the base fuel, dicyclopentadienyl iron alone, or dicyclopentadienyl iron with the lower concentration of tertiary-butyl acetate. The octane requirement increase development is more like that which is found when lead is used as an ORI control additive. The octane requirement increases rapidly and after approximately 100 hours stabilizes with virtually no further increase. In runs with no additive, dicyclopentadienyl iron alone or in combination with a lower concentration of tertiary-butyl acetate, the octane requirement increases slowly. After approximately 400 hours, the ratings appear to stabilize with a much lower rate of increase.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for operating a spark ignition internal combustion engine which comprises introducing with the combustion intake charge to said engine an octane-requirement-increase inhibiting amount of (a) an oil-soluble iron compound and (b) an oil soluble oxygen-containing compound selected from the group consisting of mono carboxylic acids having from 2 to 10 carbon atoms and ester derivatives thereof derived from said monocarboxylic acid and a tertiary alkyl alcohol having from 1 to 8 carbon atoms.

2. The method of claim 1 wherein said oil-soluble iron compound is selected from the group consisting of dicyclopentadienyl iron and substituted derivatives thereof.

3. The method of claim 1 wherein said oil-soluble iron compound is dicyclopentadienyl iron.

4. The method of claim 1 wherein said oxygen containing compound is selected from the group consisting of the esters of $C_2$ to $C_4$ monocarboxylic acids.

5. The method of claim 4 wherein said ester is the derivative of a $C_2$ to $C_4$ monocarboxylic acid.

6. The method of claim 5 wherein said ester is t-butyl acetate.

7. The method of claim 1 wherein said oil-soluble iron compound is dicyclopentadienyl iron and said oxygen-containing compound is t-butylacetate.

8. The method of claim 1 wherein said oil-soluble iron compound is introduced into said engine at a concentration of from at least about 0.0001 to about 10 grams of iron per gallon of the fuel component of said intake charge.

9. The method of claim 8 wherein said oil-soluble oxygen-containing compound is introduced into said engine at a concentration of from at least about 0.001 to about 10 grams per gallon of the fuel component of said intake charge.

10. The method of claim 7 wherein dicyclopentadienyl iron is introduced into said engine at a concentration of from at least about 0.001 to about 5 grams of iron and said t-butylacetate is introduced into said engine at a concentration of at least about 0.001 to about 10 grams per gallon of the fuel component of said intake charge.

11. A motor fuel composition comprising a mixture of a hydrocarbon of the gasoline boiling range and an octane requirement increase-inhibiting amount of (a) an oil-soluble iron compound and (b) and oil-soluble, oxygen-containing compound selected from the group consisting of mono carboxylic acids having from 2 to 10 carbon atoms, and esters thereof derived from said monocarboxylic acid and a tertiary alkyl alcohol having from 4 to 8 carbon atoms.

12. The composition of claim 11 wherein said oil-soluble iron compound is selected from the group consisting of dicyclopentadienyl iron and substituted derivatives thereof.

13. The composition of claim 11 wherein said oil-soluble iron compound is dicyclopentadienyl iron.

14. The composition of claim 12 wherein said oxygen-containing compound is selected from the group consisting of the esters of $C_2$ to $C_4$ monocarboxylic acids.

15. The composition of claim 14 wherein said ester is t-butylacetate.

16. The composition of claim 11 wherein said oil-soluble iron compound is dicyclopentadienyl iron and said oxygen-containing compound is t-butylacetate.

17. The composition of claim 12 wherein said oil-soluble iron compound is present at a concentration of at least about 0.0001 grams of iron and said oil-soluble oxygen-containing compound is present at a concentration of from at least about 0.001 grams per gallon.

18. The composition of claim 16 wherein said dicyclopentadienyl iron is present at a concentration of from about 0.0001 to about 10 grams of iron and said t-butyl acetate is present at a concentration of from at least about 0.001 to about 10 grams per gallon.

19. The composition of claim 17 wherein said dicyclopentadienyl iron is present at a concentration of from about 0.015 to about 0.04 grams iron per gallon, and said t-butyl acetate is present at a concentration of at least about 0.1 grams per gallon.

20. A concentrate suitable for use in liquid hydrocarbon fuel in the gasoline boiling range comprising:

(a) an oil-soluble iron compound, (b) an oil-soluble oxygen-containing compound selected from the group consisting of mono carboxylic acids having from 2 to 10 carbon atoms and ester derivatives thereof derived from said momocarboxylic acid and a tertiary alkyl alcohol having from 4 to 8 carbon atoms and (c) a fuel compatible diluent boiling in the range of from about 50° C. (122° F.) to about 232° C. (450° F.).

21. The concentrate of claim 20 wherein said oil-soluble iron compound is selected from the group consisting of dicyclopentadienyl iron and substituted derivatives thereof.

22. The concentrate of claim 20 wherein said oil-soluble iron compound is dicyclopentadienyl iron.

23. The concentrate of claim 21 wherein said oxygen containing compound is selected from the group consisting of the esters of $C_2$ to $C_4$ monocarboxylic acids.

24. The concentrate of claim 24 wherein said ester is the derivative of a $C_2$ to $C_4$ monocarboxylic acid.

25. The concentrate of claim 24 wherein said ester is t-butylacetate.

26. The concentrate of claim 20 wherein said oil-soluble iron compound is dicyclopentadienyl iron and said oxygen-containing compound is t-butylacetate.

27. The concentrate of claim 21 wherein said diluent is selected from the group consisting of hydrocarbons, oxygenated hydrocarbons and mixtures thereof.

28. The concentrate of claim 27 wherein said hydrocarbon is an aromatic hydrocarbon.

29. The concentrate of claim 20 wherein said oil-soluble iron compound is present at a concentration of from at least about 1 to about 50 grams of iron and said oil-soluble, oxygen-containing compound is present at a concentration of from at least about 10 to about 100 grams per gallon.

30. The composition of claim 12 wherein said substituted derivatives of dicyclopentadienyl iron are lower alkyl substituted derivatives.

31. The composition of claim 11 wherein said oil-soluble, oxygen-containing compound is present at a concentration of from 0.001 to about 10 grams per gallon of motor fuel.

32. A method for reversing the octane requirement increase of a spark ignition internal combustion engine which comprises introducing with the combustion intake charge to said engine an octane-requirement-increase inhibiting amount of (a) an oil-soluble iron compound and (b) an oil-soluble oxygen-containing compound selected from the group consisting of carboxylic acids and ester derivatives thereof.

33. The method of claim 32 wherein said oil-soluble iron compound is selected from the group consisting of dicyclopentadienyl iron and substituted derivatives thereof.

34. The method of claim 33 wherein said substituted derivatives of dicyclopentadienyl iron are lower allkyl substituted derivatives.

35. The method of claim 32 wherein said oil-soluble iron compound is dicyclopentadienyl iron.

36. The method of claim 33 wherein said oxygen containing compound is selected from the group consisting of the esters of $C_2$ to $C_{10}$ monocarboxylic acids.

37. The method of claim 36 wherein said ester is the derivative of a $C_2$ to $C_4$ monocarboxylic acid and a $C_4$ to $C_8$ tertiary alkyl alcohol.

38. The method of claim 37 wherein said ester is t-butyl acetate.

39. The method of claim 2 wherein said substituted derivatives of dicyclopentadienyl iron are lower alkyl substituted derivatives.

* * * * *

UNITED STATES PATENT OFFICE
CERTIFICATE OF CORRECTION

Patent No. 4,444,565 Dated July 19, 1984

Inventor(s) Michael C. Croudace

It is certified that error appears in the above-identified patent and that said Letters Patent are hereby corrected as shown below:

In claim 20, line 40 of column 9, delete "momo-" and insert --mono--.

In claim 24, line 2 of column 10, delete "24" and insert --23--.

Signed and Sealed this

*Eighteenth* Day of *December 1984*

[SEAL]

*Attest:*

GERALD J. MOSSINGHOFF

*Attesting Officer* *Commissioner of Patents and Trademarks*